(No Model.)
F. C. WESTON.
BRAKE FOR BICYCLES.
No. 509,636. Patented Nov. 28, 1893.
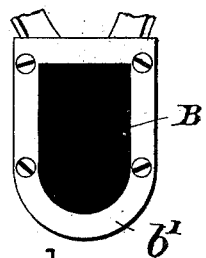
Fig. 1.
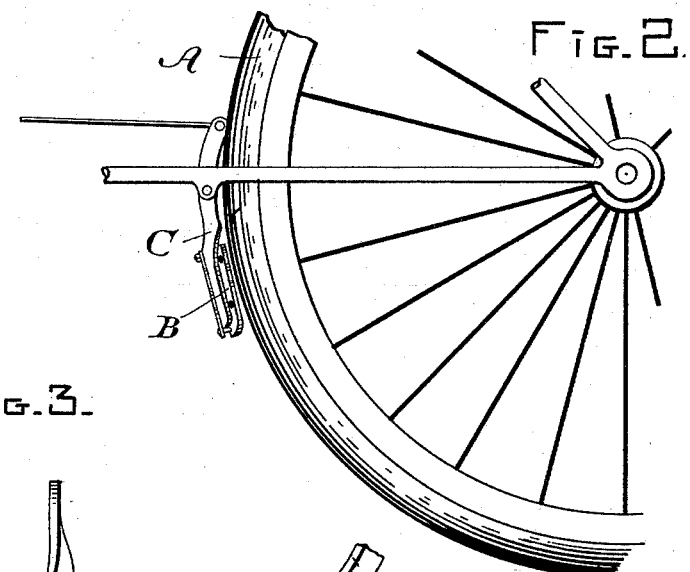
Fig. 2.
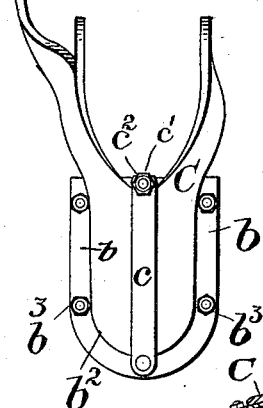
Fig. 3.
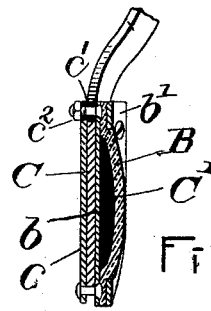
Fig. 4.
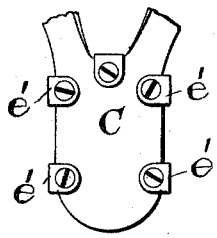
Fig. 6.
Fig. 5.
Fig. 9.
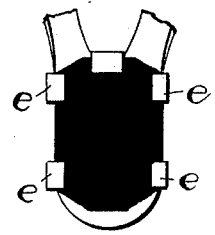
Fig. 7.
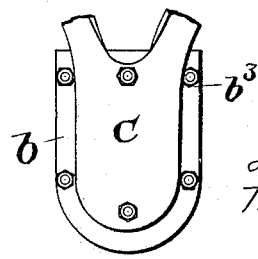
Fig. 8.
WITNESSES.
J. M. Dolon
J. W. Cummings
INVENTOR.
Frank C. Weston

UNITED STATES PATENT OFFICE.

FRANK C. WESTON, OF BANGOR, MAINE.

BRAKE FOR BICYCLES.

SPECIFICATION forming part of Letters Patent No. 509,636, dated November 28, 1893.

Application filed August 10, 1892. Serial No. 442,671. (No model.)

*To all whom it may concern:*

Be it known that I, FRANK C. WESTON, a citizen of the United States, residing at Bangor, in the county of Penobscot, in the State of Maine, have invented a new and useful Improvement in Brakes for Bicycles having Pneumatic Tires, of which the following is a full, clear, and exact description, reference being had to the accompanying drawings, forming a part of this specification, in explaining its nature.

It is well known that the common brake ordinarily used on bicycles, consisting of a curved metal shoe, is not well suited for use with bicycles having pneumatic tires, in that the brake if pressed hard upon the tire is liable to injure it or burst it or cause it to leak; and if pressed lightly is ineffectual, because its contacting surface is so smooth that the tire readily slips upon it. To remedy this defect I have devised a brake which need not be pressed against the tire with any considerable stress, and which when lightly pressed against the tire has a holding power due not to the pressure of the brake against the tire, but rather to the friction caused by the rubbing of the tire upon the holding friction surface with which the brake shoe is lined, or which constitutes the brake shoe.

There are various means by which my invention can be carried into effect, and in the drawings I have illustrated two of them.

Referring to the drawings: Figure 1 is a view in front elevation of my improved brake. Fig. 2 is a view of a portion of a Columbia bicycle showing a part of the pneumatic tire of the rear wheel and the relation which the brake bears to it. Fig. 3 is a view in rear of the ordinary brake shoe of the Columbia machine, and to which my improvement is applied as an attachment. Fig. 4 is a vertical section of the attachment and ordinary brake shoe. Fig. 5 is a horizontal section thereof. Figs. 6, 7, 8, and 9 illustrate modified forms of my invention to which reference is hereinafter made.

I have represented the invention as applied to the brake of a Columbia bicycle, and have shown only enough of a pneumatic tire to illustrate the application of my invention.

A, is a pneumatic tire. Its structure and advantages are so well known that they need not be described here. The ordinary brake shoe of a bicycle which is made of metal, and which soon wears smooth, if pressed with sufficient power to have appreciable braking effect is liable to injure or destroy the pneumatic tire, and if pressed so lightly as not to injure the tire it has no effect, or very little, upon the machine, and the tendency in using it is to force it hard against the tire, thereby injuring it.

B, represents the cushion brake. It preferably is made of a relatively thick piece of very pure rubber or rubber stock, and it is preferably held upon the surface of the curved metal support $b$ by means of a skeleton binding plate $b'$ of metal, which is detachably secured to the plate $b$, and which has the opening $b^2$, the binding plate being of a sufficient size to bear upon the edge of the cushion brake B, which may or may not be recessed upon its front face to receive it, and it acts to clamp the edge of the cushion to its holder, thereby attaching the cushion by its edge to the holder, and leaving the remainder in one piece, and exposed or extending outward from the inner edge of the binding or clamping plate. This binding or clamping plate is preferably curved to the curvature of the plate $b$, and it is represented as detachably secured to said plate by the nuts and bolts $b^3$.

The metal supporting plate $b$ is represented as detachably secured to the brake shoe or support C by means of an arm $c$, pivoted at one end to the back of the plate $b$ near its end to swing in relation to the same, and at the other end attached to the other end of the plate $b$ by a screw $c'$ and nut $c^2$. This locking plate extends upon the opposite side of the brake shoe or support from the plate $b$, and serves to lock the plate to the brake. I would not confine myself, however, to this particular method of fastening the detachable shoe to the support or brake arm, but may use any mechanical equivalent therefor; that is the number of locking bars $c$ may be increased, or the plate $b$ may have one or more screws extending from its back through screw holes in the support or ordinary shoe for the reception of clasping bolts (see Fig. 8), or the cushion shoe may be attached directly to the metal form of brake shoe, as represented in Fig. 9 by means of the clamps or binding plate, or directly to the old form of shoe by independent edge clamps e, which are made in the form of a U, and have the tightening screws upon their rear arms e', their front arms extending upon the edge of the cushion brake, and their rear arms upon the back of the brake shoe, and by tightening the screws the edge of the cushion is drawn tightly down upon the shoe. (See Figs. 6 and 7.)

By the employment of a cushion brake of the character specified, namely, one having a resilient, conformable and frictional surface, it is possible to apply sufficient braking action to a pneumatic tire, without forcing the brake against the tire with sufficient stress to injure it. In other words it will act effectually at light pressure. As such brakes will not, of course, wear as long as metal brakes, it is necessary that there be secured thereon a support or holder in a manner not only to permit of the ready removal and substitution of the cushion brake itself, but also of the removal and replacement of its holder or support when one is employed, and this too without removing the arm or lever, which actuates it, from the machine. It is desirable also that this cushion should be reinforced by a curved rigid backing, which acts to give it a curved form, or one that approximates very nearly the curve of the outer edge of the tire.

The effectiveness of the cushion brake is increased when it is also a pneumatic brake; that is when there is an air cushion or resistance back or behind the flexible resilient braking surface B, and in Figs. 1 to 5 inclusive the cushion brake is represented as provided with an air backing C', the air being confined between the plate b, clamp plate b' and the resilient material B, the three forming an air-tight compartment.

Having thus fully described my invention, I claim and desire to secure by Letters Patent of the United States—

1. In a bicycle, the combination with the brake mechanism, of a pneumatic brake shoe.

2. In a bicycle, the combination with the brake mechanism, of a pneumatic brake shoe the face of which is of flexible and highly frictional material.

3. In a bicycle, the combination with the brake mechanism, of a brake shoe having a rigid back and a pneumatic face portion.

4. In a bicycle, the combination with the brake mechanism, of a brake shoe having a rigid back portion, a highly frictional and elastic face portion, and a skeleton clamping plate between which and the outer part of said rigid back portion the elastic face portion is held.

5. The combination with a bicycle brake shoe, of the plate b removably secured thereto, a skeleton clamping plate b', and the cushion B of soft, flexible and highly frictional material the edges of which are clamped to said plate b by the said skeleton clamping plate.

6. The combination with a bicycle brake shoe, of the plate b removably secured thereto, a skeleton clamping plate b', the cushion B of soft, flexible and highly frictional material and the edges of which are clamped to said plate b by the said skeleton clamping plate, and a cushioned backing for the said friction cushion B.

7. The bicycle brake comprising a resilient or flexible bearing section B, and an air cushion C' back or behind said material and acting against the same, as and for the purposes described.

FRANK C. WESTON.

In presence of —
GEO. B. CANNEY,
JOHN H. RICE.